Patented June 10, 1941

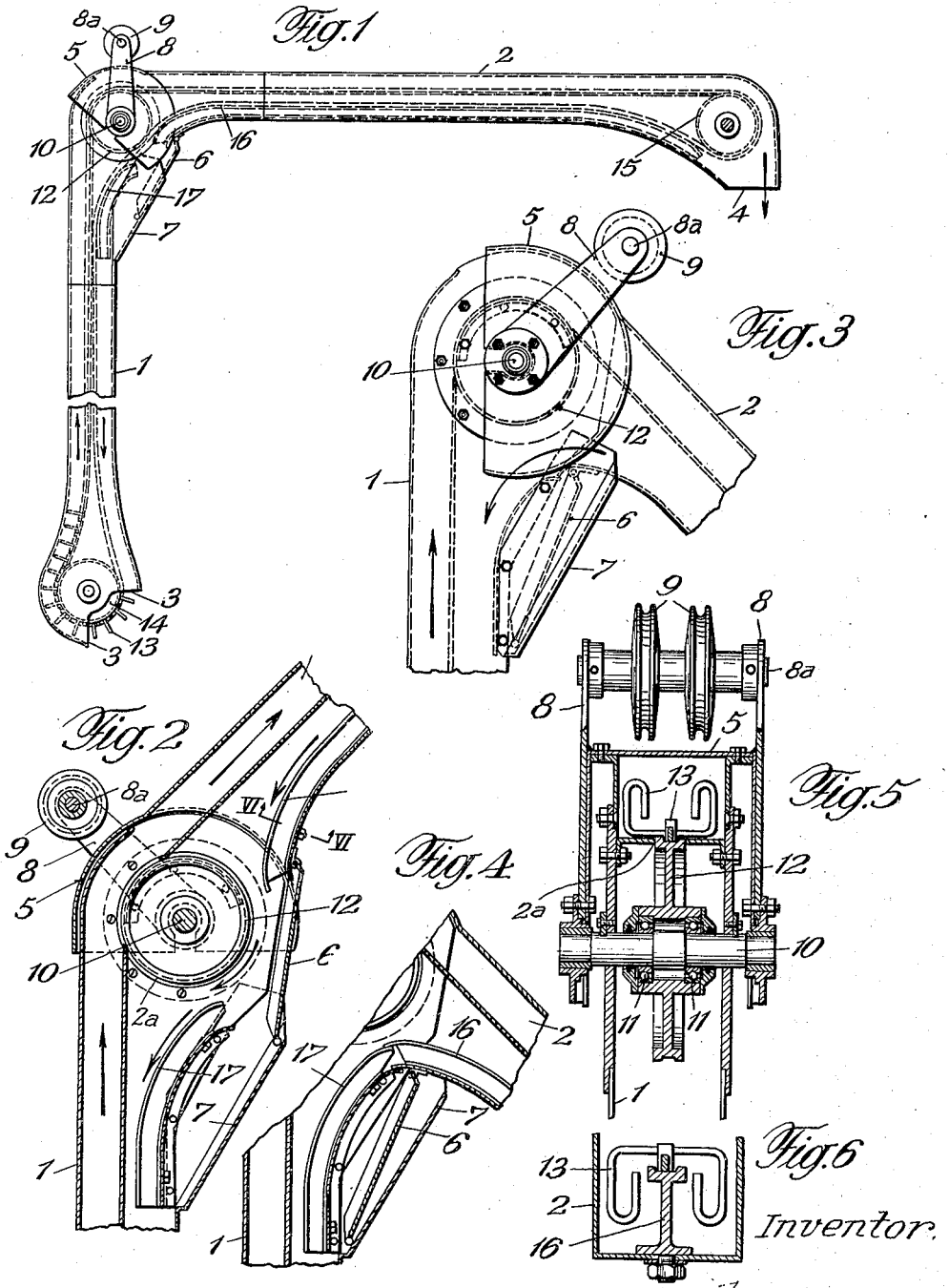

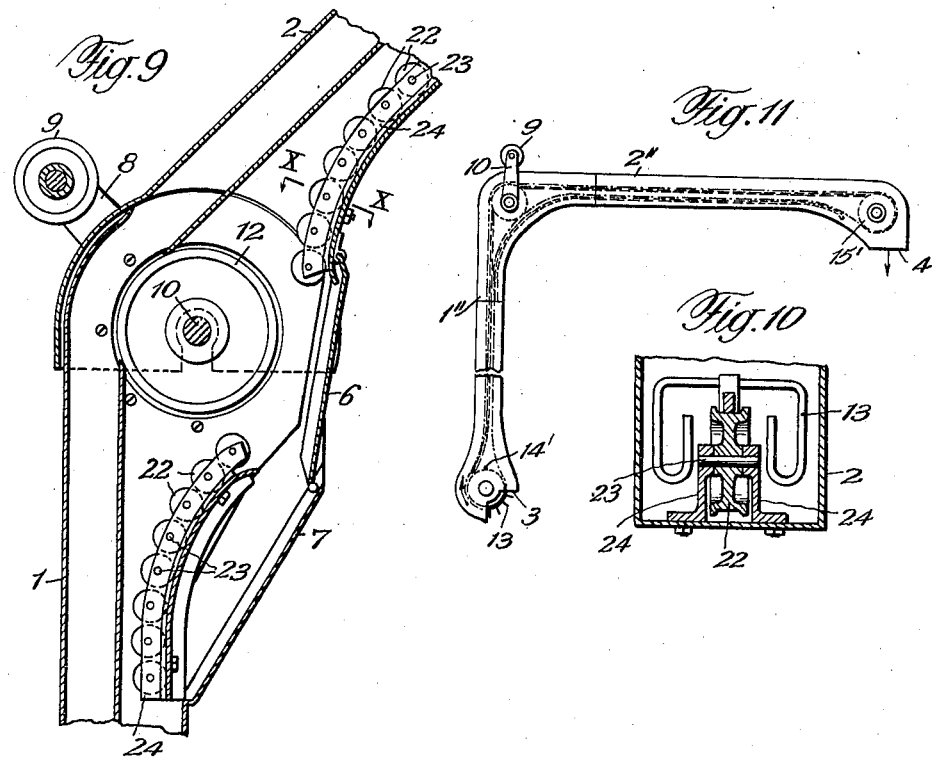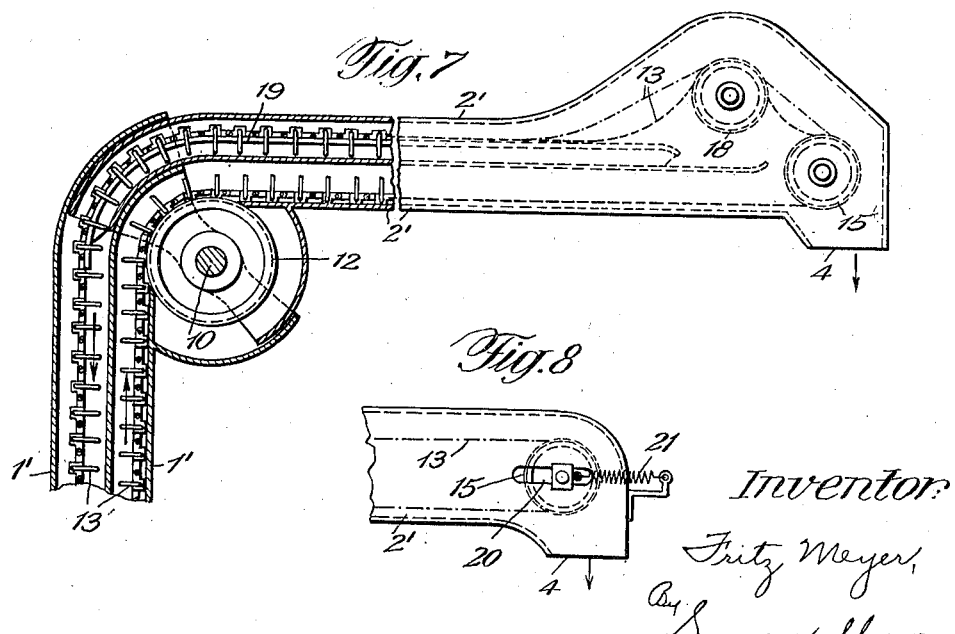

2,245,113

UNITED STATES PATENT OFFICE 2,245,113

CONTINUOUS FLOW CONVEYER

Fritz Meyer, Uzwil, Switzerland, assignor to the firm Bühler Brothers, Uzwil, Switzerland Application January 17, 1940, Serial No. 314,310
In Germany January 18, 1939

8 Claims. (Cl. 198—109)

The present invention relates to continuous flow conveyers used more particularly for unloading loose material from ships and comprising a closed trough along which the material is hauled in a continuous stream by a conveyer chain.

In known unloading devices of this kind, using trough sections which are disposed at an angle relatively to each other, there are used either two separate chain conveyers for two trough sections forming an angle with each other, or one chain conveyer is used for the vertical trough section only which is connected to a tipping chute. In the first case the two conveyer chains require a complicated driving system, while in the second case a loss of power will result.

The object of the present invention is the provision of an unloading device for ships which avoids the above mentioned drawbacks.

The invention consists in the arrangement of two closed trough sections disposed at an angle one with respect to the other and containing a common conveyer chain which passes over a guide member arranged at the place where the two trough sections join each other. Preferably the two trough sections are hingedly connected to be movable relatively to each other, so that the vertically extending section can be lowered or raised to any desired unloading position.

The accompanying drawings represent by way of example several embodiments of the invention.

Figure 1 is a side view of an unloading device for ships comprising two relatively movable trough sections according to the invention.

Figure 2 is a section across the hinge connection of the troughs, drawn to a larger scale and showing the trough sections in another angular position.

Figure 3 is a side view of the hinge connection showing a still further angular position of the trough sections.

Figure 4 is a fragmentary section corresponding to the side view of Fig. 3.

Figure 5 is a transverse section of the hinge connection.

Figure 6 is a transverse section, drawn to a larger scale, along the line VI—VI of Fig. 2.

Figure 7 is a fragmentary view, partly in section, of a modification of the unloading gear according to the invention.

Figure 8 shows a modification of the device according to Fig. 7.

Figure 9 is a fragmentary section of a further modification.

Figure 10 is a transverse section according to the line X—X of Fig. 9.

Figure 11 is a side view of a still further modification of the unloading device.

With reference to Figs. 1 to 6, the unloading device for ships comprises two conveyer trough sections 1 and 2 disposed at an angle one relatively to the other. The trough section 1 extends vertically and is provided with an admission opening 3 at its bottom end. The upper end of the trough section 1 is hingedly connected with one end of the trough section 2, the other end of which is is provided with a discharge opening 4. At the hinge connection the trough section 2 forms with its outer side a semicylindrical casing portion 5 extending over the upper end of the trough section 1, and at its inner side the trough section 2 is provided with a hingedly connected wall member 6 which is slidably guided along an inwardly inclined wall member 7 of the trough section 1. The two wall members 6 and 7 prevent the loss of the loose material traversing the trough and provide a closed chamber for the hinge connection in an angular position of the two trough sections 1 and 2. By rocking the trough sections about their hinge connection, they can be brought from the position shown in Fig. 1, where they extend at right angles to each other, to the positions shown in Fig. 2 or in Fig. 3, where they form an angle with each other. For raising and lowering the trough sections, the section 2 carries two arms 8 supporting a shaft 8a on which are mounted two rollers 9 by the intermediary of which the troughs are suspended. A shaft 10 is supported by the trough section 2 at the hinge connection and carries by means of ball bearings 11 a guide roller 12 the rim of which penetrates through a slot 2a in the trough section 2 and guides the middle portion of a chain 13 formed, for example, by a so called "Redler" type chain. The chain 13 runs over a chain wheel 14 disposed at the admission opening of the troughs, and over a chain wheel 15 disposed near the discharge opening. The returning chain side is guided in the trough section 2 by a rail 16 supporting the middle portion of the chain (Fig. 6). A corresponding guide rail 17 is disposed in the trough section 1. The returning chain side runs underneath the guide roller 12, so that the varying length of the other chain side, when raising or lowering the trough section 1, may be compensated.

The modified unloading device shown in Fig. 7 comprises two trough sections 1' and 2' which are movable relatively to each other about the axis 10. The adjacent ends of the walls of the trough sections are fitted one over the other. The right side of the trough section 1' and the lower half of the trough section 2' serve for conveying the material in the direction indicated by arrows, by means of the conveying chain 13 which is guided over the roller 12 disposed at the hinge joint. The chain 13 conveys the material in a continuous stream to the discharge opening 4 and then runs over a chain wheel 15 disposed near the discharge opening. The returning chain side passes first over an auxiliary roller 18 and then moves along a guide rail 19 extending along the trough section 2' and penetrating into the upper part of the trough section 1'. Between the auxiliary roller 18 and the chain wheel 15, and between the auxiliary roller 18 and the beginning of the rail 19, the chain 13 can sag more or less according to the relative position of the two trough sections, so as to provide for compensation of the varying length of the chain. Such compensation is necessary in the arrangement according to Fig. 7 because both chain sides extend on the same side of the axis 10 whereby the length of the chain varies with a change in the relative position of the trough sections 1' and 2'.

In the device according to Fig. 8 the chain wheel 15 is slidably mounted in slots 20 provided in the sides of the trough section 2', and the chain is tensioned by means of a spring 21 acting on the wheel and providing a compensation for the varying length of the chain.

In the modification according to Figs. 9 and 10 the guide rails 16 and 17 of Fig. 1 are replaced by a number of successively arranged small rollers 22 which guide the returning side of the chain 13 at the hinge connection. The journals 23 of the rollers 22 are engaged in supporting rails 24 secured to the trough sections 1 and 2, respectively.

In the modification according to Fig. 11 the two trough sections 1'' and 2'' are rigidly connected to each other. This arrangement can be used in such cases where it is not required to change the height or vertical adjustment of the trough section 1'', or where both trough sections can be raised or lowered together. The trough again contains a chain 13 passing over a chain wheel 13 disposed at the admission opening 3 and a chain wheel 15' disposed near the discharge opening 4. The arms 10 secured to the trough serve to support the rollers 9 used for raising or lowering the trough.

Instead of two series of guiding rollers, as shown in Fig. 9, a single roller 22 may be disposed near each of the adjacent ends of the trough sections 1 and 2, respectively, for guiding the returning side of the chain.

I claim:

1. A continuous flow conveyer for loose material, comprising a closed conveyer trough having inlet and discharge openings at opposed ends thereof, said trough including two angularly disposed trough sections hingedly connected to each other to be relatively movable about the hinge connection, a single endless conveyer chain common to both trough sections and mounted to move longitudinally of the trough between the inlet and discharge openings, a guide roller for said chain mounted in the trough at the place where the two trough sections meet each other for guiding the chain over the hinge connection, one side of the chain passing above the roller and the other side of the chain passing beneath the roller in order to compensate the varying length of the chain upon angular adjustment of the trough sections, and overlapping means at the adjacent ends of the trough sections to form a tight joint between the two sections and prevent loss of conveyer material at the hinge connection.

2. A continuous flow conveyer for loose material, comprising a closed conveyer trough having inlet and discharge openings at opposed ends thereof, said trough including two relatively movable trough sections hingedly connected to each other to be relatively movable to various positions of angular adjustment, a single endless conveyer chain common to both trough sections and mounted to move longitudinally of the trough between the inlet and discharge openings, a guide roller mounted in the trough at the place where the two trough sections meet for guiding the chain over the hinge connection, both sides of the endless chain passing over the guide roller on the same side thereof, and a device for compensating the varying length of the chain resulting from a change of the angular adjustment of the two trough sections.

3. A continuous flow conveyer for unloading loose material from ships, comprising a closed conveyer trough, said trough having two relatively movable, hingedly connected trough sections angularly arranged with respect to one another, an endless conveyer chain common to both trough sections and having a carrying run and a return run traveling longitudinally of the trough and over the hinge connection thereof, means disposed at the hinge connection of the two trough sections for guiding the carrying run of the chain over the hinge connection, and means carried by the adjacent ends of the trough sections for guiding the returning run over the hinge connection.

4. A continuous flow conveyer for unloading loose material from ships, comprising a closed conveyer trough, said trough having two relatively movable, hingedly connected trough sections angularly arranged with respect one to another, an endless conveyer chain common to both trough sections and having a carrying run and a return run traveling longitudinally of the trough and over the hinge connection thereof, a guide roller mounted on the axis of the hinge connection for guiding the carrying run of the conveyer chain over the hinge connection, and means carried by the adjacent end of the trough sections and coacting with said guide roller for guiding the return run of the chain on its passage past the hinge connection.

5. A continuous flow conveyer for unloading loose material from ships, comprising a closed conveyer trough, said trough having two relatively movable, hingedly connected trough sections angularly arranged with respect one to another, an endless conveyer chain common to both trough sections and having a carrying run and a return run moving longitudinally of the trough and past the hinge connection thereof, a guide roller mounted on the axis of the hinge connection and supporting the carrying run of the conveyer chain on its passage past the hinge connection, and guide rollers carried by the adjacent ends of the two trough sections for guiding the returning run of the conveyer chain on its passage past the hinge connection.

6. A continuous flow conveyer for unloading loose material from ships, comprising a closed conveyer trough, said trough having two relatively movable, hingedly connected trough sections angularly arranged with respect one to another, an endless conveyer chain common to both trough sections and having a carrying run and a return run moving within the trough, a guide roller mounted on the axis of the hinge connection for supporting the carrying run of the chain passing above the roller on its way past the hinge connection, and means carried by the adjacent ends of the two trough sections for guiding the return run of the chain passing below the roller on its way past the hinge connection, one of the trough sections having a semi-cylindrical end portion adjacent the hinge connection fitting over the end of the other trough section to permit relative angular movement of the two trough sections and to form a continuous closed conveyer channel at any position of angular adjustment of the two trough sections.

7. A continuous flow conveyer for loose material, comprising a closed conveyer trough having inlet and discharge openings at opposed ends thereof, said trough including two relatively movable trough portions hingedly connected to each other and forming an angle with each other, a single endless conveyer chain common to both trough sections and longitudinally movable with the trough, a guide roller mounted in the trough for guiding the conveyer chain over the hinge connection of the two trough sections, one of the trough sections being provided with a wall portion extending obliquely with respect to the direction of said section in proximity to the hinge connection, and the other trough section carrying a hingedly mounted wall portion coacting with said first mentioned wall portion and sliding therealong upon an angular adjustment of the two trough sections to form a closure of the trough at the hinge connection and to prevent any loss of conveyed material.

8. A continuous flow conveyer for loose material, comprising a closed conveyer trough having inlet and discharge openings at opposed ends thereof, said trough including two relatively movable and hingedly connected trough portions disposed at an angle one with respect to the other, an endless conveyer chain common to both trough sections and mounted to move longitudinally of the trough between the inlet and discharge openings, guide means disposed at the hinge connection of the two trough sections for guiding the conveying side of the chain over the hinge connection, at least one guide roller carried by the end of each trough section adjacent to the hinge connection for guiding the returning side of the chain, and coacting means provided at the adjacent ends of the trough sections for forming a tight closure of the trough at the hinge connection in any position of angular adjustment of the trough sections.

FRITZ MEYER.